United States Patent [19]

Roach

[11] 4,050,913
[45] Sept. 27, 1977

[54] VORTEX AIR CLEANER ASSEMBLY WITH ACOUSTIC ATTENUATOR

[75] Inventor: Charles J. Roach, Brooklyn, N.Y.

[73] Assignee: Pall Corporation, Glen Cove, N.Y.

[21] Appl. No.: 571,032

[22] Filed: Apr. 23, 1975

Related U.S. Application Data

[63] Continuation-in-part of Ser. No. 484,001, June 28, 1974, abandoned, which is a continuation of Ser. No. 316,326, Dec. 18, 1972, abandoned.

[51] Int. Cl.² ............................................. B01D 45/14
[52] U.S. Cl. ...................................... 55/276; 55/347; 55/414; 55/450; 55/457; 181/210
[58] Field of Search ................. 55/276, 306, 347, 348, 55/391, 414, 449, 450, 456, 457, 484; 181/33 HA

[56] References Cited

U.S. PATENT DOCUMENTS

| | | | |
|---|---|---|---|
| 2,112,608 | 3/1938 | Schmidt | 55/276 X |
| 2,552,847 | 5/1951 | Farr et al. | 55/484 X |
| 3,472,001 | 10/1969 | McMakin | 55/484 X |
| 3,520,114 | 7/1970 | Pall et al. | 55/457 X |
| 3,726,359 | 4/1973 | Dierl et al. | 181/42 |

Primary Examiner—Frank W. Lutter
Assistant Examiner—Kathleen J. Prunner

[57] ABSTRACT

A vortex air cleaner and acoustic attenuator assembly is provided having an array of vortex air cleaners which remove contaminant particles from influent air, and an array of spaced acoustic sheets defining passages therebetween for reception of clean effluent air from selected groups of adjacent vortex air cleaners in the array, the sheets being shaped and spaced to deflect such effluent air and sound pressure waves at least once from the acoustic surface of the sheets, thereby absorbing the maximum sound in the preferred frequency range of 8000 Hertz and reducing the imposed sound pressure level in which the vortex air cleaner assembly operates.

18 Claims, 9 Drawing Figures

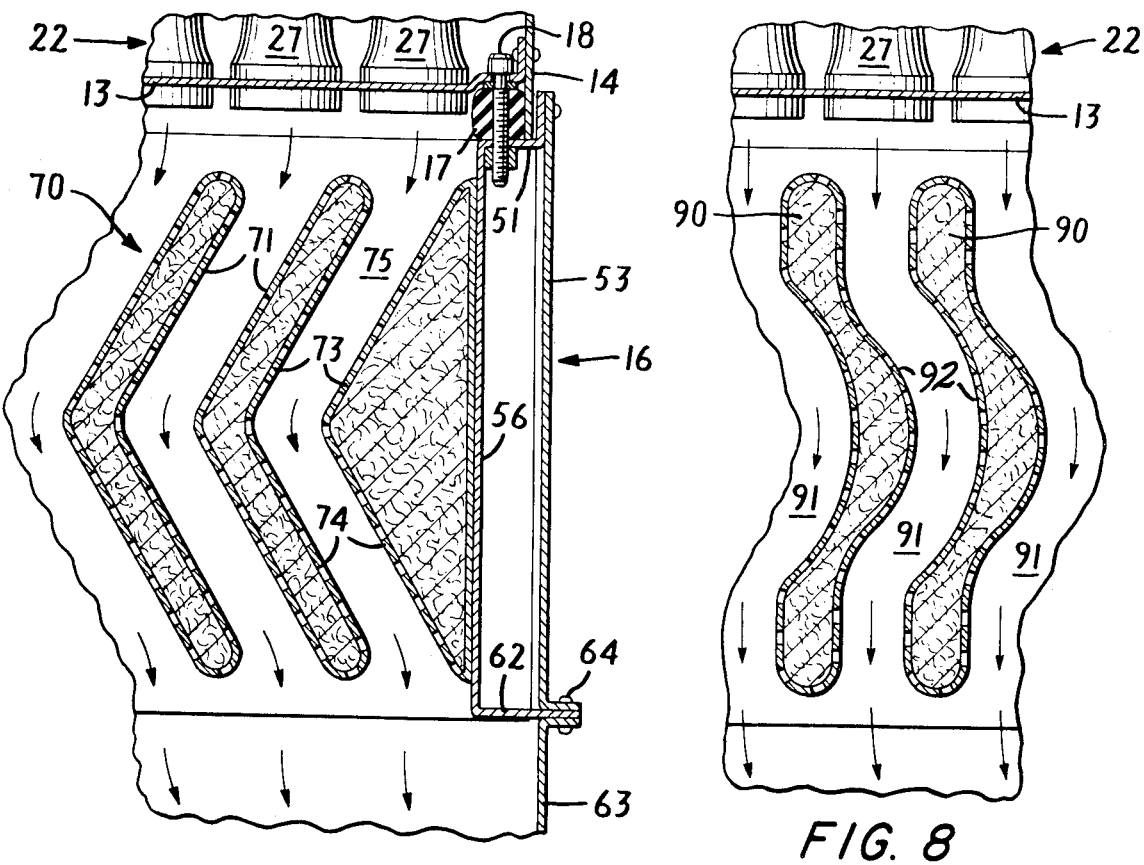
FIG. 6
FIG. 8
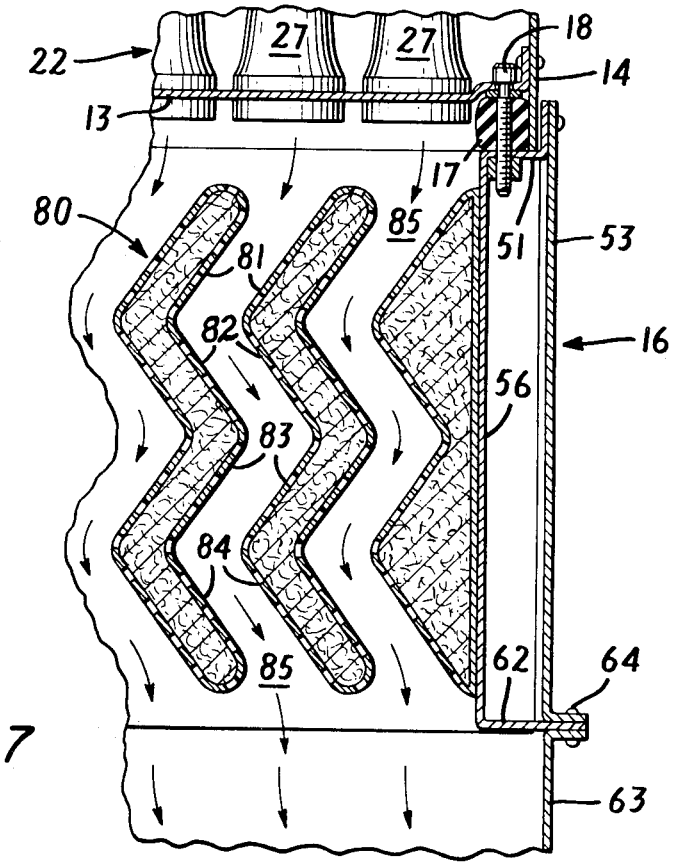
FIG. 7

VORTEX AIR CLEANER ASSEMBLY WITH ACOUSTIC ATTENUATOR

This application is a continuation-in-part of Ser. No. 484,001 filed June 28, 1974, and now abandoned, which in turn is a continuation of Ser. No. 316,326 filed Dec. 18, 1972, and now abandoned.

Gas turbine engines used on stationary power plants, mobile road vehicles and aircraft normally require an extremely high flow of air into the engine during operation. In dusty environments and when aircraft operate close to the ground, such vehicles stir up great amounts of dirt which can rapidly destroy a gas turbine engine. For example, during landing and take-off from a dirt landing strip, a typical small helicopter engine can ingest approximately one-half pound of dirt per minute; larger helicopters can ingest two to four pounds of dirt per minute. This has resulted in engine failure on helicopters in combat operations in less than 10% of their normal service period, due to dirt-caused erosion of the engine.

The problem is complicated by the fact that not only must dirt be efficiently removed from the air entering the engine intake, but it must be removed with the least amount of power loss from the engine. Normally, with a full load, a helicopter requires maximum power to take off and enter forward flight. Inlet restrictions to the gas turbine engine causes a power loss, if engine power is lost, for example, due to the operation of an air cleaner, the load may have to be lightened. This can mean that one or more passengers which otherwise could have been accommodated must be left behind.

Vortex air cleaners have been provided to remove dirt from air entering such an engine with low inlet restrictions. These air cleaners form a vortex or cyclone stream of the dirt-laden air passing through a tube, either by placing a deflector in the tube in the path of the influent air stream, or by introducing the air stream tangentially to the tube wall. Since the dirt particles are relatively heavy, they are thrown to the periphery of the vortex. The air at the center of the vortex is left relatively free of dirt particles. The clean air is normally drawn off from the center of the tube, and the dirt particles collected at the periphery of the tube.

The term "vortex air cleaner" as used herein thus refers to an air cleaner which comprises a straight tubular air cleaner body having a central passage with an inlet and an outlet at opposite ends; a deflector adjacent the inlet for creating a vortex stream in the influent air to concentrate any contaminant particles in the air at the periphery of the passage, and clean the air at the center of the passage; and an outlet member having a central clean air passage communicating with the central passage of the tubular body and disposed within the passage at the outlet, the exterior wall of the outlet passage member defining a generally annular contaminant scavenge passage within the central passage of the tubular body through which pass contaminant particles while relatively clean air at the center of the passage passes through the central clean air passage of the outlet member.

Vortex air cleaners have the advantage that the inlet restriction and therefore the pressure drop, between the inlet and outlet is quite low. Thus, they cause little power loss to the engine.

Furthermore, if a scavenge flow of air is employed to sweep contaminant particles from the assembly, higher cleaning efficiencies can be obtained, and the unit becomes self-cleaning.

Since small vortex air cleaners have a relatively low pressure drop, at moderate flows, and consequently cause little power loss to the engine, a large number of such vortex air cleaners are used in groups, in an array, on aircraft, to accommodate the large total flows required.

The term "vortex air cleaner array" as used herein refers to an assembly composed of a plurality of vortex air cleaners mounted together as a unit with their axes aligned in parallel, or a group of such assemblies. The vortex air cleaners are normally held between support plates which hold vortex air cleaners in position at their inlets and outlets. The scavenge passages of the vortex air cleaners empty into a common scavenge chamber, which is normally between the support plates. A scavenge port is provided in a wall of the scavenge chamber, for the removal of contaminant particles therefrom. The clean air outlet of the air cleaners open into the space beyond the support plates, and the clean air thus runs straight through the air cleaners at high velocity. It is considered important to have the clean air follow a straight-through course, to minimize pressure drop.

U.S. Pat. No. 3,520,114, dated July 14, 1970, to David B. Pall and Robert I. Gross, describes one type of vortex air cleaner array useful in aircraft, including flow-restricting means in the line of flow between the scavenge port of the array and the scavenge passage of the other vortex air cleaners, to restrict the scavenge flow therefrom, and to minimize the variation in scavenge flow among all air cleaners of the array, thereby providing substantially uniform scavenge flow for all vortex air cleaners of the array.

A serious problem in conjunction with the use of vortex air cleaner arrays of this and other types is the high noise level in which they operate. The blade passing frequency of the high speed gas turbine compressor produces a high frequency noise which is characteristic of gas turbine inlet noise, which radiates forward and out of the engine inlet. Noise abatement regulations now in force at most airports and ground facilities cannot normally be met by gas turbine engines equipped with vortex air cleaner arrays, except at very low engine speeds, when the volume of dirty air ingested is low. This has imposed a severe restriction on the full power use of gas turbine engines operating in dirty environments, on the ground or on aircraft. Aircraft have to operate from airports with noise restrictions to airports in many parts of the world, particularly Africa and Asia, where it is important that even commercial aircraft be equipped with these devices, because of the dirt conditions that may be encountered there.

It has been proposed that the clean air outlets of the vortex air cleaner array be followed by an array of open straight tubes with perforated walls encased in a sound absorber, each corresponding in effect to an extension of the outlet tube for clean air of each air cleaner of the array. These tubes are placed in line with the air cleaner tubes, and form in-line straight extended passages shorter than, as long as, or longer than the air cleaner tubes themselves, and of a diameter similar to the outlet tube passages of the air cleaners through which the clean air must pass before it leaves the array. The passages are straight-through and fully open, and in the course of traversing such passages, the sound pressure waves are absorbed, reducing the noise level. Thus, the passages serve as acoustic attenuators. However, the combination of such an array of tubes with a vortex air cleaner array has a pressure drop which is proportional to the velocity squared, which is approximately the same as the vortex air cleaner outlet tube velocity.

In accordance with the invention, it has been determined that an array of spaced acoustic sheets presenting a larger area than the outlet tubes outlet area and defining passages therebetween arranged (1) to receive clean air from a selected group of several adjacent vortex air cleaners in an array, (2) to cause such air to expand, thus reducing the velocity thereof, and (3) to deflect such air at least once from the acoustic surface of the sheets, constitutes an acoustic attenuator. This attenuator, moreover, has a lower pressure drop thereacross than would be expected. In fact, in the assemblies of the invention, the total pressure drop across the combination of vortex air cleaner array and array of intercepting spaced acoustic sheets is less than the pressure drop across either the vortex air cleaner array or the array of intercepting acoustic sheets, taken separately. The reason for this effect, which is quite unexpected, is not understood, but it appears that in the case of intercepting sheets there is a smooth deceleration of the air flow, with efficient transfer of velocity pressure to static pressure, producing an Evase or diffuser pressure regain, which is reflected or which appears as a lower static pressure in the array, as compared to an array of straight tubes. Consequently, the array of intercepting sheets introduces a lower static pressure drop than an array of straight tubes corresponding more or less in diameter and in an in-line position to the individual straight vortex air cleaners of the array.

The intercepting spaced acoustic sheets in the acoustic attenuator of the invention are substantially uniformly spaced apart, and all are of substantially the same configuration. The term "intercepting" is used herein to refer to a sheet that is so placed and so spaced from adjacent sheets as to intercept and deflect at least once a stream of clean effluent air, whatever its direction, from the vortex air cleaners of the selected group. The air stream and sound pressure waves must bounce off the acoustic sheets at least once, in proceeding through each passage, and preferably at least twice.

The sheets can be straight or curved or doglegged. If straight, the sheets are set at an angle to the axis of the vortex air cleaners, so as to deflect the air stream and sound pressure wave therefrom from a straight-through course. Depending on this angle, straight acoustic sheets can effect one or more deflections per traverse. If curved, the curve of the sheets must extend over an arc at least long enough so that it is not possible to see from one end to the other end of the passages between the sheets of the array. The curve can be compound or double, so as to obtain two or more deflections of the air stream passing through. If doglegged, the two portions of the sheet are at an angle to the axis of the vortex air cleaner array, and the angle of the dogleg should be sufficient to cause at least one deflection. Such an angle is within the range from about 90° to about 175°.

Waveform and embossed or indented or dimpled sheets can also be used. A zigzag, straight or reversed or sinusoidal curved configuration can be used to ensure a plurality of deflections. However, if more than two deflections are required in the traverse of the passages, the pressure drop across the attenuation may be increased. Hence, an attenuator requiring only one or two deflections from a straight-through course is preferred.

It will of course be understood that the portions of the air stream and sound pressure wave traversing the passages may undergo many deflections, in bouncing back and forth between the spaced walls of the passages, and that the number of deflections per passage will vary. However, for purposes of computing deflections in assessing the effectiveness of a given sheet and passage configuration, only the minimum number of deflections from a straight-through course required for traverse of the passages is counted.

The acoustic sheets have a thickness and open area that is calculated to ensure maximum sound absorption in the frequency range of interest, classically in the range of 4000 to 16,000 Hertz for gas turbine inlets, since they have an acoustic or sound-absorbing surface, and a spacing to provide from 25% to 75% open area at the inlet end openings of the passages therebetween, preferably about 50% open area, calculated as % of the total surface area on the inlet face of the acoustic sheet array, to ensure expansion of the clean air from the vortex air cleaner array within said passages and to minimize pressure drop thereacross and produce a maximum sound absorption, and from 75% to 25%, preferably about 50%, closed area calculated as % of the total surface area on the inlet face of the acoustic sheet array, as acoustic sheet end surfaces, i.e., the sheet thickness, on the inlet side facing the outlet side of the vortex air cleaner array.

At a thickness below 0.5 inch, sound absorption capability is rather high at a very high frequency; also the pressure drop will be high because of the large hydraulic surfaces. Optimum sound absorption in the range of interest, 8000 Hertz, is obtained at a thickness of approximately 1 inch. There is no upper limit on thickness.

However, the passages between the acoustic sheets are in flow communication with the clean air passages of the outlet members of the vortex air cleaners, and the inlet end openings of the acoustic sheet passages are substantially in alignment with the clean air passages, for direct flow thereinto from the vortex air cleaner array in a straight-through course. The passages between the acoustic sheets must have a diameter corresponding to, i.e., approximately the same as, the diameter of the outlet passages of the outlet members of the vortex air cleaners; the larger the diameter, the lower the frequency of maximum sound absorption. If the outlet passages of the outlet members are tapered, the smallest diameter of the outlet passage is taken as the diameter to which the diameter of the acoustic passages is to correspond. The passages or multiples thereof must be spaced to match up with, i.e., so as to be in direct fluid flow connection with, the outlet member passages of the vortex air cleaners in the vortex air cleaner groups of the air cleaner array. Accordingly sheet thickness plus passage diameter (i.e., closed area plus open area) must equal vortex air cleaner outlet member passage inside diameter, taken at the smallest diameter of the outlet member passage, plus the distance between the inside wall of the passage through the outlet member, taken at the smallest diameter of the outlet passage, of the air cleaners in one row of the array, to the inside wall of the passage through the outlet members, taken at the narrowest diameter of the outlet passage, of adjacent air cleaners of the next row.

The acoustic sheets can be made of or surfaced with any sound-absorbing material. For example, metal or plastic sheet can be used, surfaced if desired with sound-absorbing material. Two spaced metal or plastic sheets can be made up as a sandwich, the sheets preferably being perforated, or in mesh form, with sound-absorbing material therebetween, such as a nonwoven fibrous mat, and also surfaced if desired with sound-absorbing fabric. Such a sound-absorbing sandwich can be enclosed in a thin plastic membrane or sheet for moisture-proofness, to prevent entry of moisture into the interior sound-absorbing layer; this membrane or sheet does not prevent sound absorption by the contents.

The length of the acoustic sheets and passages depends upon their spacing. The wider the spacing, the longer the sheets and passages have to be, for good sound attenuation. The minimum length for a 1-inch spacing is about 6 inches, for greater than 40 decibels attenuation. A shorter length, say about 3 inches, will produce approximately 20 decibels attenuation. The upper limit of length is not critical, and is imposed by pressure drop, since the longer the passage, the higher the pressure drop in traversing it. A 1-inch spacing 12 inches long will produce approximately 45 decibels attenuation. Usually, the passages are not longer than 12 inches, because of the asymptotic increase in attenuation with linear increase in pressure drop.

The intercepting acoustic sheets in the attenuator are arranged so that their defined passages accept effluent air from two, three, four, five or six rows of vortex air cleaners in the array. Six rows is the maximum number of rows generally used in air cleaners for good cleaning efficiency, but of course the invention is not limited to six rows. The passages may accept air from vortex air cleaners extending all the way or only part way across any part of the array. Normally, the acoustic sheets are parallel, or approximately parallel, but they can also be arranged to define passages that are triangular, rectangular, or other polygonal shapes, in cross-section, as desired.

In the vortex air cleaner array, usually the individual air cleaners are spaced together as closely as possible. This usually means, as shown in U.S. Pat. No. 3,520,114, that the individual air cleaners are arranged in parallel rows, with the individual cleaners of each row being slightly and uniformly offset from the cleaners of the next row. In this way, the rows can be placed slightly closer together than the outside diameter of the adjacent individual air cleaners would otherwise allow. Such an array, in accordance with a preferred embodiment of the invention, is followed by an acoustic attenuator of sheets which are in parallel, and which are spaced apart according to their thickness to define passages in flow communication with the clean air passages of the outlet members of the vortex air cleaners, and substantially in alignment therewith. These passages are slightly smaller in diameter than the diameter of the outlet passages of the outlet members of the air cleaners, providing direct fluid flow connections with the outlet passages of the outlet members of air cleaners in single parallel rows of air cleaners of the air cleaner array.

It is, of course, possible for the air cleaner array to assume other forms and arrangements of the air cleaners. The individual air cleaners can be arranged in rows spaced further apart than shown in U.S. Pat. No. 3,520,114. In all cases, however, in the preferred embodiment, the acoustic sheets in the attenuator are arranged in parallel and define through passages therebetween in flow communication with the clean air passages of the outlet members and substantially in alignment therewith.

In the drawings:

FIG. 6 is a longitudinal section through another embodiment of vortex air cleaner and acoustic attenuator assembly of the invention;

FIG. 7 is a longitudinal section through another embodiment of vortex air cleaner and acoustic attenuator assembly in accordance with the invention;

FIG. 8 is a longitudinal section through another embodiment of vortex air cleaner and acoustic attenuator assembly in accordance with the invention.

Figure 1:
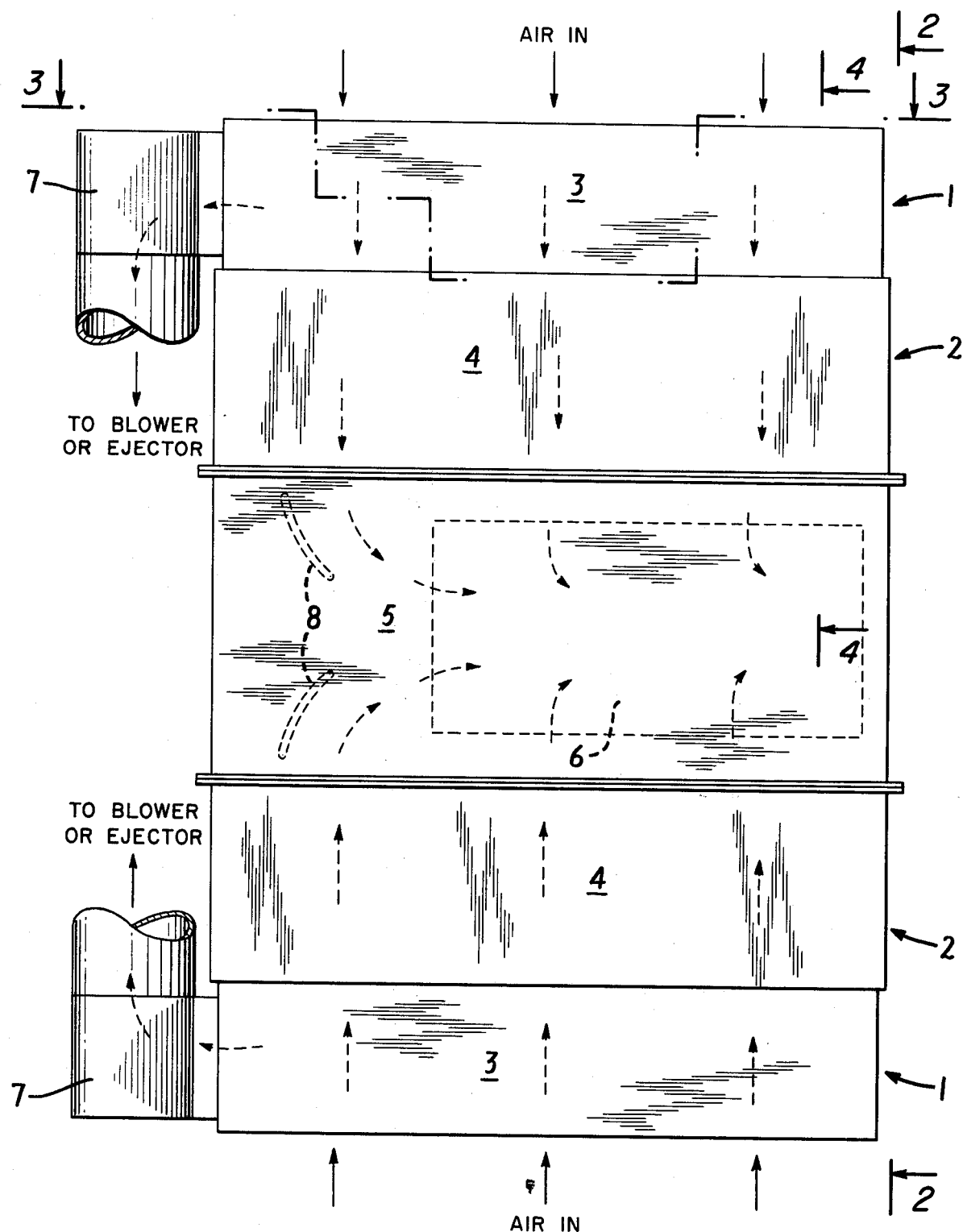
FIG. 1 is a schematic representation from the side of two vortex air cleaner and acoustic attenuator assemblies in accordance with the invention, mounted to the air intake line of a jet engine.
Figure 2:
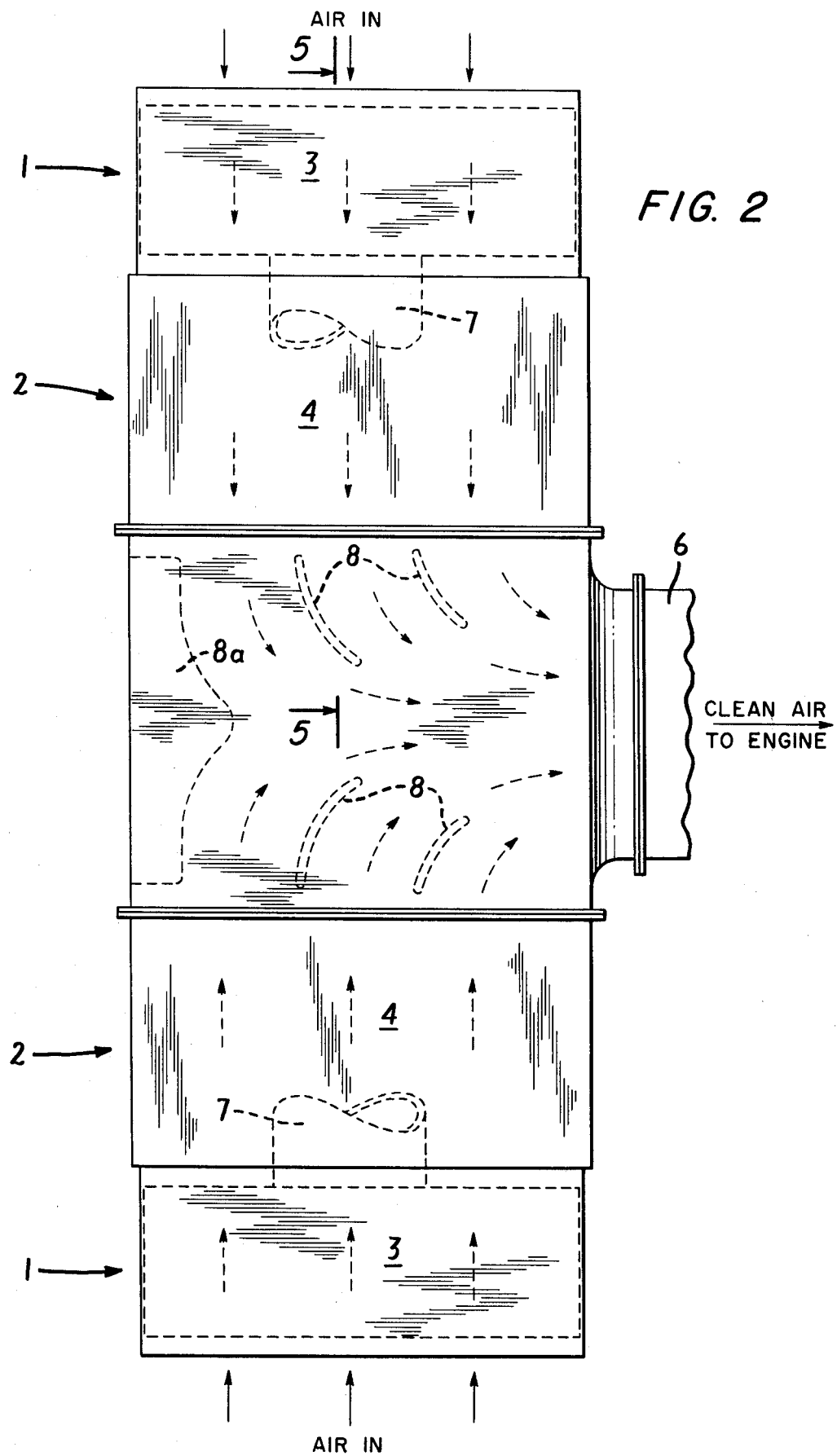
FIG. 2 is a schematic representation from the top of the air cleaner and attenuator assembly of FIG. 1, taken along the line 2—2 of FIG. 1, and looking in the direction of the arrows.

The vortex air cleaner assembly 1 of FIGS. 1 to 5 comprises an array 3 of vortex air cleaners and the acoustic attenuator assembly 2 comprises an array 4 of acoustic attenuators mounted to the inlet duct 5 at the air intake 6 of a gas turbine engine. An outlet line connection 7 from each air cleaner array is connected to a blower for scavenge air flow to remove dirt separated by the vortex air cleaners. Baffles 8, 8a in the duct 5 help guide clean air exiting from the acoustic attenuator array 4 and produce additional attenuation via liner sound absorption to the intake 6 of the engine.

The vortex air cleaner tube assembly 3 (best seen in FIGS. 3 to 5) comprises an array of vortex air cleaners 10 supported in an air cleaner housing 11 comprising a vortex generator plate 12 and an outlet tube plate 13 closing off the open end of an enclosing shell 14. The vortex generator and outlet plates 12 and 13 are turned 90° at their periphery, and are held to the shell 14 by rivets 15. The inner plate is shock-mounted to the acoustic attenuator housing 16 through rubber air seals 17 and bolts 18, access to which is provided by apertures 18a and removable plugs 18b in plate 12.

The vortex generator and outlet tube plates 12, 13 are formed with a plurality of apertures 20 and 21. The apertures 20 accommodate and support the vortex generator tubes 22. Each vortex generator tube 22 comprises a tubular housing 23 having a central passage 33, an inlet 24 and an outlet 28. A vortex generator 26 is disposed within the central passage 33 adjacent the inlet 24. The housing 23 is made of asbestos or glass-filled polypropylene.

The vortex generator 26 is made of filled polypropylene and is bonded in position at the inlet by a resin adhesive. The vanes 29 are helical.

The apertures 21 accommodate and support the generally tapered tubular outlet tubes 27, disposed with one end extending into the outlet 28 of the passage 33. The outlet tubes have a tapered central open passage 32 therethrough for the removal of clean air. The outlet tubes define an annular space 30 between the vortex generator housing 23 and the outer periphery of the outlet tube 27, for the removal of dirt particles.

The apertures 20 on the vortex generator plate 12 engage in a circumferential groove 19 about the inlet 24 of each vortex generator housing tube 23 of each separator 22. The apertures 21 in the outlet tube plate 13 each engage a circumferential groove 25 on each outlet tube 27. The space 31 between the support plates 12 and 13 (which defines the interior of the air cleaner housing 11) communicates with the annular passage 30 of each separator and constitutes a scavenge chamber. The duct 7 (see FIGS. 1 and 2) communicates the scavenge chamber 31 to the suction port of a blower (not shown). The clean air passes through the central passage 32 of the outlet tubes 27 without entering the contaminant scavenge chamber 31.

Under ideal conditions, the average pressure drop through each tube at 2250 s.c.f.m. is approximately eight inches water column from the inlet 24 of each vortex generator tube 22 to the clean air outlet 35 of the outlet tube 27.

The acoustic attenuator array (best seen in FIGS. 3 to 5) comprises a number of parallel doglegged acoustic sheets 40, in number equal to the number of rows of vortex air cleaners, plus two end sheets 40a, 40b (eight in all, for six rows). The dogleg sections 44a, 44b of each sheet 40 depart from the longitudinal axis of the array by a distance slightly in excess of the width of the passages 44 between adjacent sheets of the array, and are at an angle of 40° to that axis. Each sheet 40 is actually a sandwich of two perforated metal plates 41 filled with nonwoven glass fiber mat 43. The sheets 40 are held at their ends 45, which are flanged at 46, in apertures 47 of support plates 48, 49. It will be noted that the sheets 40 are spaced apart to define passages 44 therebetween whose diameter is slightly less than the diameter at the outlet end of the flared outlet passages of the outlet members 27 of the vortex air cleaners of array 10, and approximately the same as the smallest diameter at the inlet end of the said outlet passages and that the sheets 40 have a thickness that is approximately the same as the distance between the inside wall of the outlet members, taken at the narrowest point of the outlet member passage, of the vortex air cleaners in one row and the inside wall of the outlet members, taken at the narrowest point of the outlet member passage, of the next adjacent row; and each passage 44 has its inlet end opening substantially in alignment with the clean air passages 32 of the outlet members 27, and receives clean air in a direct fluid flow connection from the outlet members 27 in one row of the vortex air cleaner array, and serves as a passage for delivery of clean air from that row of the array, at the outlets of the passages 44 of the attenuator array.

The end sheets 40a, 40b are each mounted as by welding or brazing to side support plates 55, 56. The support plates 55, 56 are turned at their edges to flanges 50, 51 which receive the bolts 18, and flanges 61, 62 which are rigidly attached to side plates 53, 54.

Side plates 48, 49 have flanges 57, 58, which receive bolts 18, and are each riveted to side plates 59, 60. The edges of plates 53, 54, 59, 60 abut, and the joint is closed by welding, closing the attenuator array housing.

The rivets 64 attach the attenuator array housing 16 and bolts 18 in turn the vortex air cleaner housing 11 to the duct 5, on the one side via baffle 8a and on the other side via duct wall 63.

In the embodiment shown as exemplary in FIGS. 1 to 5, the acoustic sheets 40, 40a, 40b, are approximately six inches long overall, with the length of the passages between the sheets being slightly in excess of 6 inches, due to the doglegs 44a, 44b.

The array of acoustic sheets 40 is spaced slightly from the vortex air cleaner array, by from $\frac{1}{4}$ to 1 inch.

In operation, dirty air enters the central passages 33 at inlets 24 of the air cleaners 22 of the vortex air cleaner array 10, acquires a helical swirl in passing the vortex generators 26, and thereby the dirt is flung centrifugally to the periphery of the passages 33. The air at the core of the passages is clean. The clean cores are tapped by outlet members 27, which the dirty air passes through annular spaces 30 into scavenge chamber 31, and is removed in scavenge duct 7.

The clean air emerges from outlet members 27 via outlets 35, and enters the passages 44 between the acoustic sheets 40, 40a, 40b, of the attenuator array. The air is proceeding in a straight course from outlets 35, but is deflected into the doglegs 44a of the array and then deflected again upon the doglegs 44b before emerging from the passages 44. Sound pressure waves from the engine compressor spherically propagate from the engine inlet 6 counter to the air flow. Baffles 8 and 8a produce some sound attenuation, approximately 10%, in changing the direction of the sound pressure waves in directing the waves through passages 44 between the acoustic sheets 40, 40a and 40b of the attenuator array where the major sound absorption (attenuation) occurs, approximately 70%. Sound pressure waves are deflected into the doglegs 44b of the array and then deflected again upon the doglegs 44a before emerging from the passages 44 at a very much reduced sound pressure level. The sound pressure wave enters the air cleaner outlet 35, passes through central passage 32 into central passage 33, then through vortex generator 26. In traversing the air cleaner passages 32, 33 additional attenuation, approximately 20%, occurs. At each section, sound is absorbed, and by the time the air has reached the end of the passages, the sound level is that at the inlets 24 of the array.

In the embodiment shown in FIG. 6 the attenuator array is composed of a plurality of doglegged acoustic sheets 70, similar to those of FIGS. 1 to 5, with perforated metal sheets 73 but with two straight legs 73, 74 at an angle of 30° to the axis of the air cleaner array. Thus, the air from the air cleaner array is deflected at least once in traversing the passages 75 between the plates 70.

The embodiment shown in FIG. 7 comprises a plurality of parallel W-curved acoustic sheets 80, similar to those of FIGS. 1 to 5, but each with four straight legs 81, 82, 83, 84, at an angle of 30° to the axis of the air cleaner array, that define passages 85 requiring at least four or five deflections of the air that traverses them from the vortex air cleaner array.

FIG. 8 shows another embodiment in which the acoustic sheets 90, of the same type of FIGS. 1 to 5, have a smooth uniformly curved arc 92 of a circle long enough and at a radius of curvature sufficient to ensure at least one deflection and normally two of sound waves traversing the passages 91.

Figure 10:
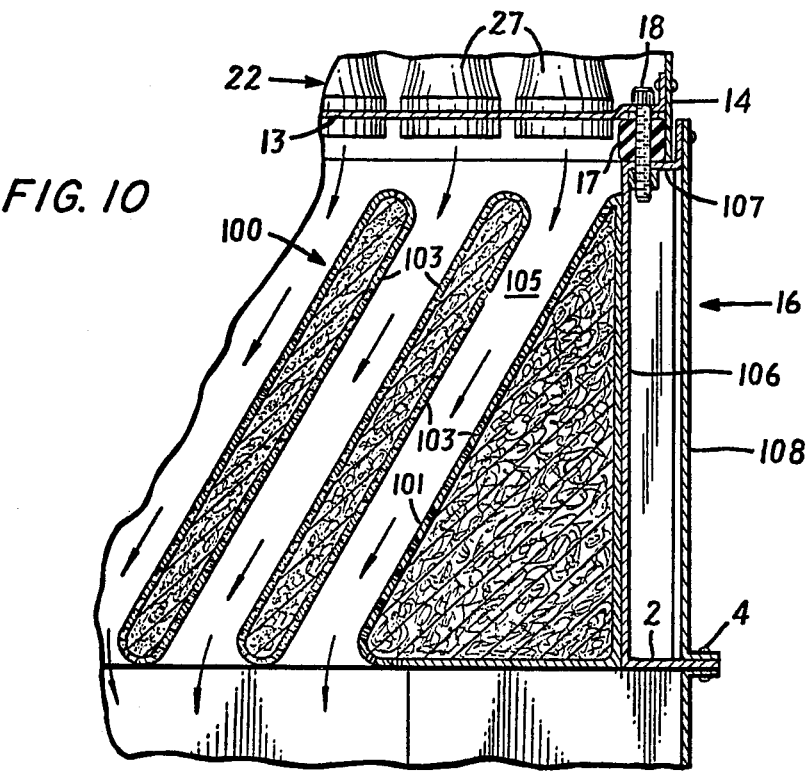
FIG. 10 is a longitudinal section through another embodiment of vortex air cleaner and acoustic attenuator assembly of the invention.

In the embodiment shown in FIG. 10 the attenuator array is composed of a plurality of straight acoustic sheets 100, 101 similar to those of FIGS. 1 to 5, with perforated metal sheets 103 but with straight through passages 105, at an angle of 30° to the axis of the air cleaner array 22. Thus, the air from the air cleaner array is deflected at least once in traversing the passages 105 between the sheets 100, 101.

Figure 3:
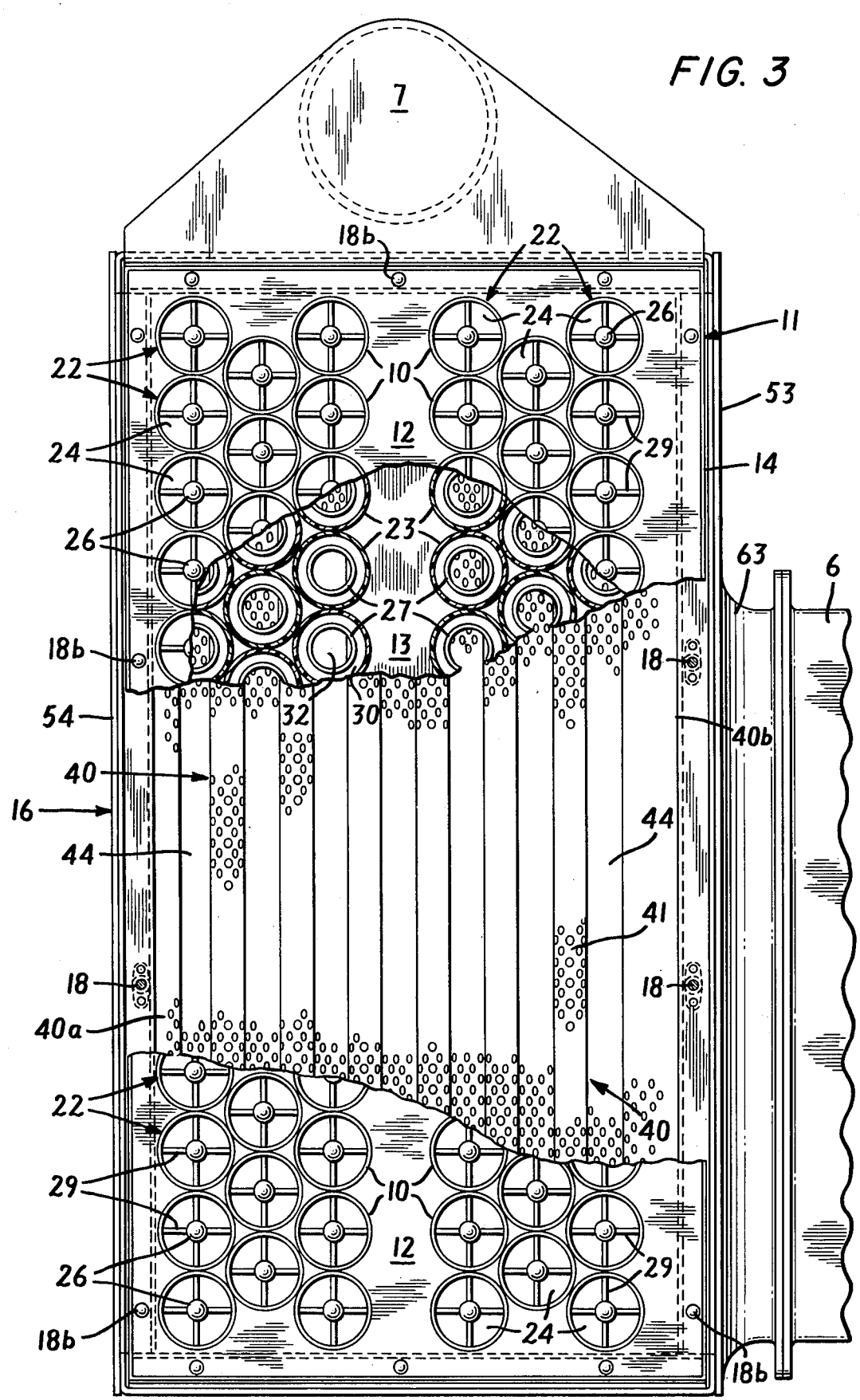
FIG. 3 is an end view, partly in section, of the inlet end of the vortex air cleaner and acoustic attenuator assembly of FIGS. 1 and 2, taken along the line 3—3 of FIG. 1.
Figure 4:
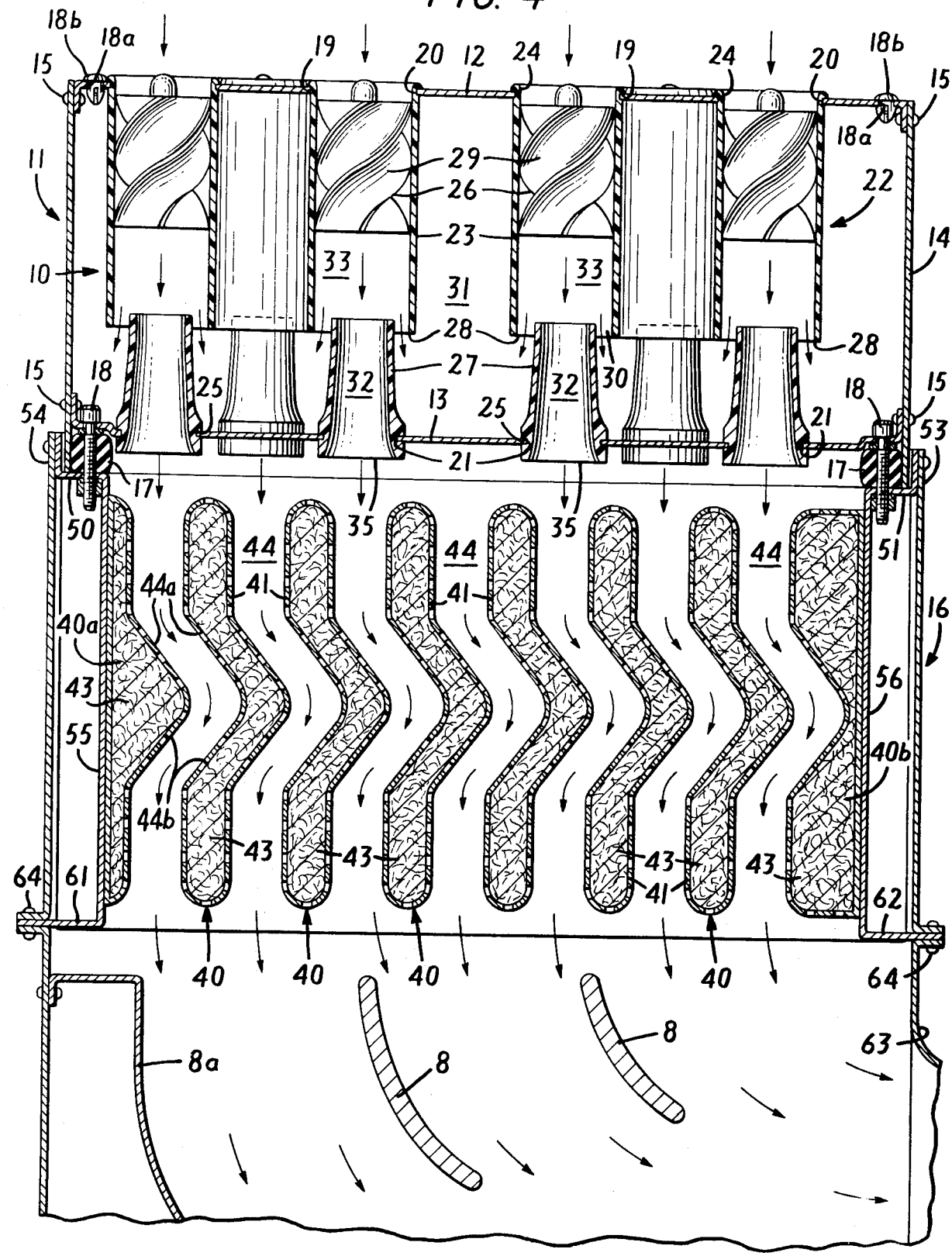
FIG. 4 is a partial longitudinal section through the vortex air cleaner and acoustic attenuator assembly of FIGS. 1 and 2, taken along the line 4—4 of FIG. 1.
Figure 5:
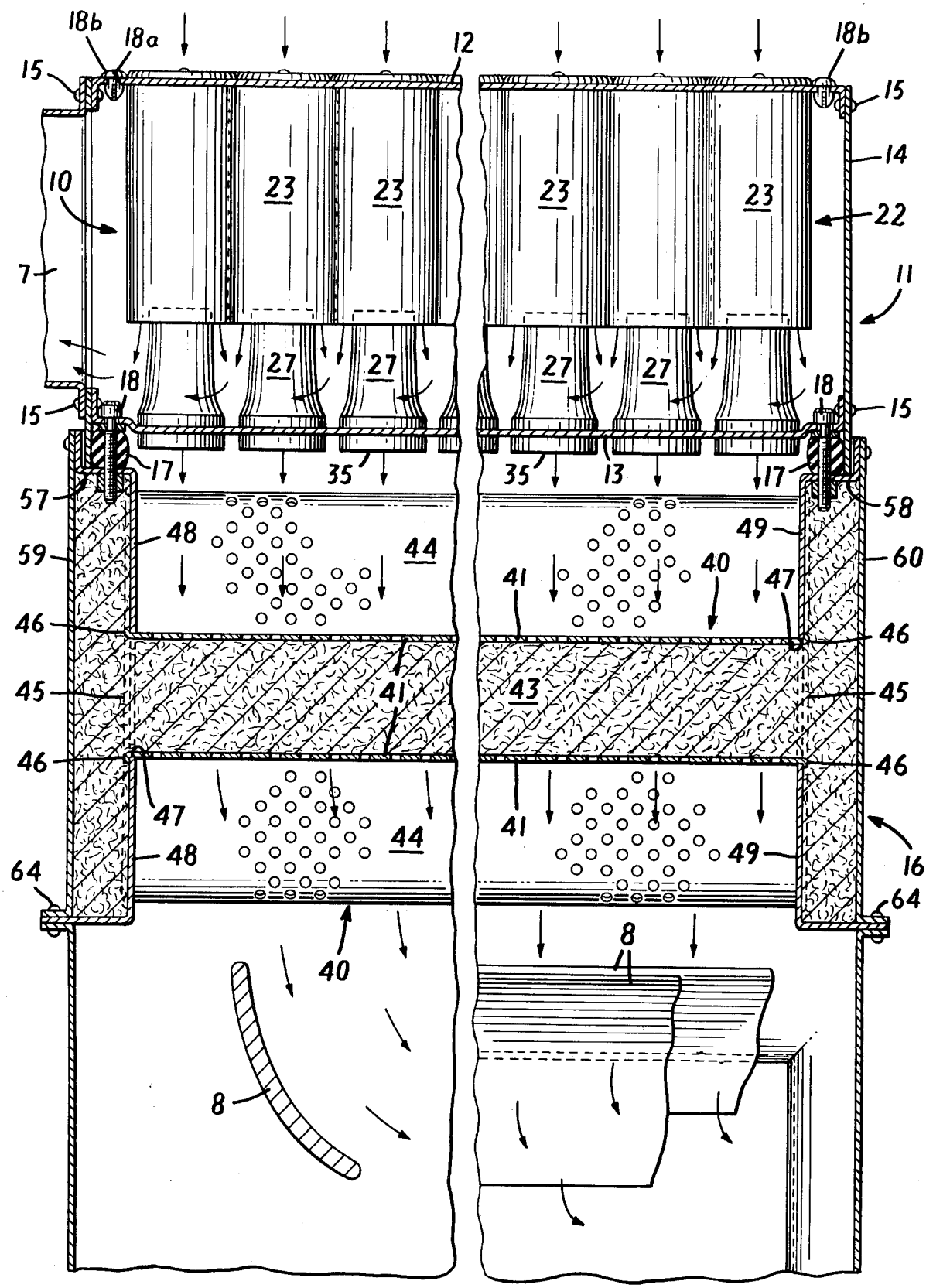
FIG. 5 is a longitudinal section through the vortex air cleaner and acoustic attenuator assembly of FIGS. 1 and 2, taken along the line 5—5 of FIG. 2.
Figure 11:
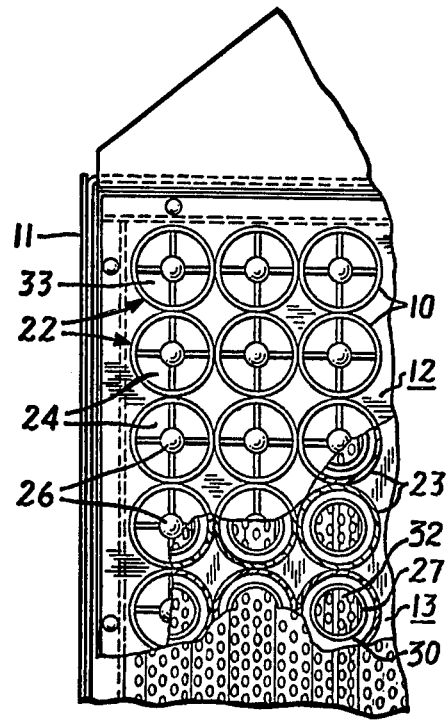
FIG. 11 is an end view, partly in section, of the inlet end of another embodiment of vortex air cleaner assembly, showing the rows of vortex air cleaners arranged diametrally.

In the embodiment of FIG. 11, the array of vortex air cleaners has the individual air cleaners arranged in rows, diametrally, instead of nested, as in FIGS. 1 to 5, (best seen in FIG. 3.)

As in the vortex air cleaner tube assembly of FIGS. 1 to 5, the vortex air cleaners 10 of FIG. 11 are supported in an air cleaner housing 11, comprising a vortex generator plate 12 and an outlet tube plate 13, closing off the open end of an enclosing shell 14. The vortex generator and outlet plates 12 and 13 are turned 90° at their periphery, and are held to the shell 14. The vortex generator and outlet tube plates 12 and 13 are formed with a plurality of apertures, which accommodate and support the vortex generator tubes 22. Each vortex generator tube 22 comprises a tubular housing 23 having a central passage 33, an inlet 24 and an outlet 28. A vortex generator 26 is disposed within the central passage 33 adjacent the inlet 24. The housing 23 is made of asbestos-or glass-filled polypropylene, and the housings 23 of the tubes 22 in adjacent rows are abutting diametrally.

The outlet tube 27 defines an annular outlet passage 30 for contaminant-laden air and a central outlet passage 32 for clean air.

The remarkable feature of the vortex air cleaner-acoustic attenuators of the invention is the low pressure drop across the combination as compared to the pressure drop across the vortex air cleaner array and the acoustic attenuator array taken alone. The pressure drop across the combination is consistently lower than the additive pressure drop of the two components.

Figure 9:
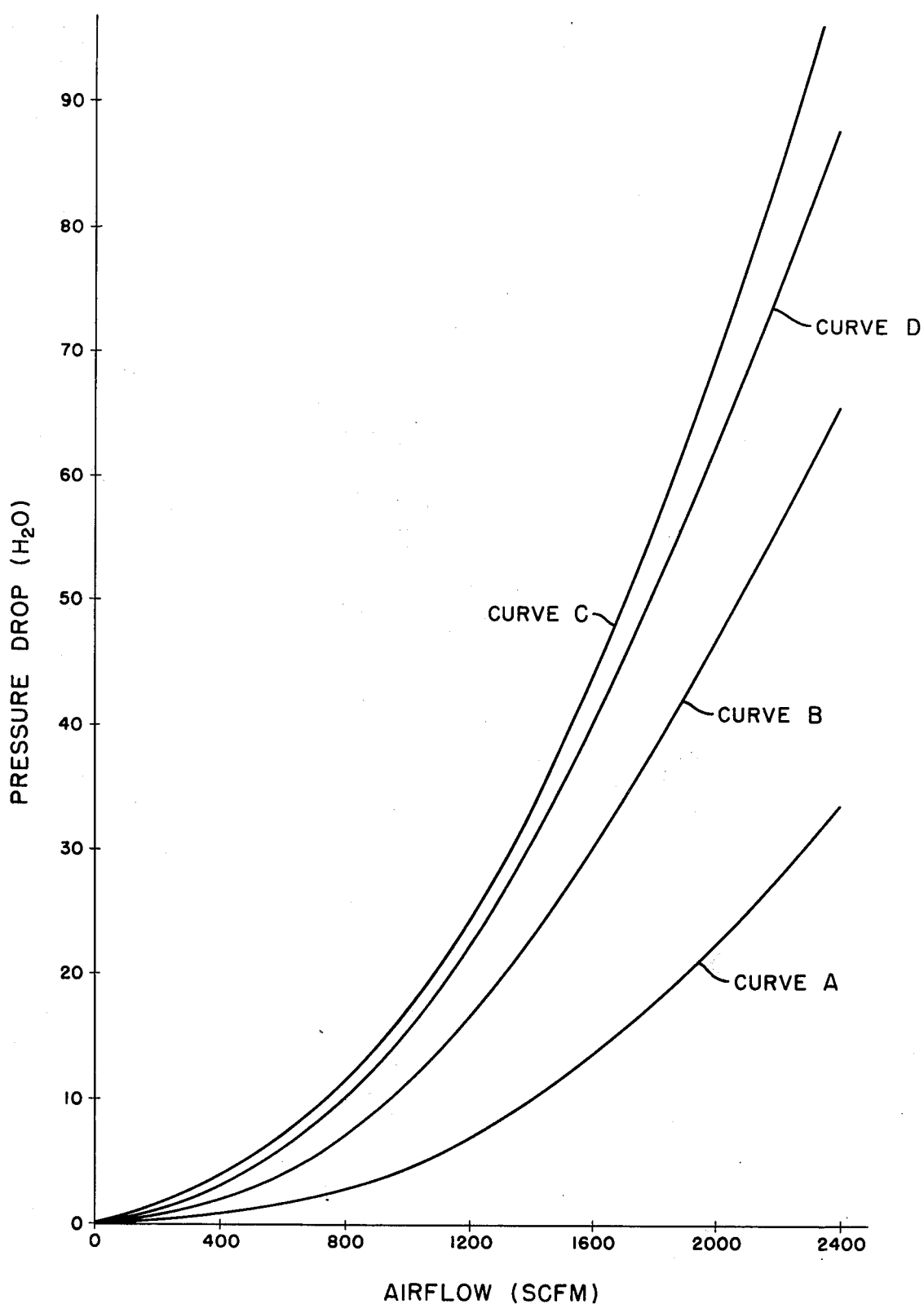
FIG. 9 is a graph showing the pressure drop across another embodiment of vortex air cleaner-acoustic attenuator of FIGS. 1 to 5, over a range of air flows.

Results typical of the combinations in accordance with the invention are shown in the graphs of FIG. 9.

FIG. 9 shows the pressure drop in inches of water at air flows ranging from 0 to 2400 s.c.f.m., for the individual components, vortex air cleaner array and the attenuator array, and the combination thereof in the structure shown in FIGS. 1 to 5. The vortex air cleaner array had 30 individual air cleaners, positioned as shown in FIGS. 1 to 5, having a face area of 150 square inches (12¼ inches × 12¼ inches). There was zero scavenge flow in the vortex air cleaner array. The air cleaner to acoustic attenuator spacing was one-half inch, and the acoustic attenuator sheets were 6 inches long. Curve A in the Figure represents the pressure drop at the air flows indicated for the acoustic attenuator array alone. Curve B represents the pressure drop at the air flows indicated for the vortex air cleaner array alone. Curve C represents the expected additive pressure drop across the combination of vortex air cleaner array and acoustic attenuator array, i.e., Curve A plus Curve B, and Curve D represents the actual measured pressure drop for the combination. It is apparent that Curve D is below Curve C at all air flows used.

The reduction in pressure drop across the combination as compared to the individual components of the combination, taken separately, is realized with other configurations of acoustic sheets. Table I gives pressure drop data for a number of combinations in accordance with the invention, in which the acoustic sheets had the length and configuration shown in FIGS. 1 to 5, and in FIG. 6, and shows that the pressure drop across the combination is less than the additive pressure drop of each of the components taken separately, in the case of FIGS. 1 to 5, and greater than the additive pressure drop of each of the components taken separately in the case of FIG. 6. All of the data taken in the Table was obtained at an air flow of 2250 s.c.f.m., across a face area of 150 square inches (12¼ inches × 12¼ inches) at the air cleaner array and the acoustic attenuator array. The configuration of acoustic attenuator adopted provided 50% open area, and the length of the acoustic attenuator sheets was either 6 inches or 12 inches, as indicated in the Table.

Table I

| Figure No. | Length of Acoustic Sheets (inches) | Ⓐ Acoustic Attenuator ΔP H₂O (inches) Measured | Ⓑ Air Cleaner 30 Tube Module ΔP H₂O (inches) Measured | Air Cleaner + Ⓐ + Ⓑ ΔP H₂O (inches) Additive | Acoustic Attenuator Ⓐ + Ⓑ ΔP H₂O (inches) Measured |
|---|---|---|---|---|---|
| 1 to 5 | 12 | 3.24 | 6.0 | 9.24 | 8.6 |
| 1 to 5 | 6 | 2.98 | 6.0 | 8.98 | 8.0 |
| 6 | 6 | 1.86 | 6.0 | 7.86 | 8.2 |
| 6 | 12 | 1.46 | 6.0 | 7.46 | 7.6 |

The vortex air cleaner-acoustic attenuator combinations of the invention are capable of noise reductions of up to 20 decibels in the frequency range from 0 to 1,000 Hertz, and from 20 to 55 decibels in the frequency range from 1,000 to 10,000 Hertz. Acoustic sheets 12 inches in length produce slightly higher noise reduction than acoustic attenuator sheets 6 inches in length, but both are quite effective.

Having regard to the foregoing disclosure, the following is claimed as the inventive and patentable embodiments thereof:

1. A vortex air cleaner-acoustic attenuator comprising, in combination, a housing having an inlet and an outlet arranged for air flow therethrough; and, disposed in the housing across the line of air flow from the inlet to the outlet, in sequence, a first array comprising a plurality of vortex air cleaners, in which the vortex air cleaners comprise a straight tubular air cleaner body having a cylindrical central passage with an inlet and an outlet at opposite ends, and a deflector adjacent the inlet for creating a vortex stream in the influent air to concentrate any contaminant particles in the air at the periphery of the passage, and clean the air at the center of the passage, and an outlet member having a central clean air passage communicating with the cylindrical central passage of the tubular body and disposed within the passage at the outlet, the exterior wall of the outlet member defining a generally annular contaminant scavenge passage within the cylindrical central passage of the tubular body through which pass contaminant particles, while relatively clean air at the center of the passage passes through the central clean air passage of the outlet member; and a second array comprising a plurality of spaced acoustic sheets defining passages therebetween arranged in flow communication with the clean air passages of the outlet members of the vortex air cleaners in the first array, the acoustic sheet passages having a diameter that is approximately the same as the diameter at the narrowest point of the clean air passages of the outlet members of the vortex air cleaners in the air cleaner array, so that the total of acoustic sheet thickness plus acoustic sheet passage diameter approximates the total of clean air passage inside diameter at the narrowest point plus the distance between the inside walls of the clean air passages, taken at the narrowest point of the clean air passages, of the outlet members of the air cleaners in one row, and the inside walls of the clean air passages, taken at the narrowest point of the clean air passages, of the outlet members of the air cleaners in the next adjacent row in the air cleaner array feeding air into the acoustic sheet passages, the inlet end openings of the acoustic sheet passages being substantially in alignment with the air cleaner passages for direct flow thereinto from the vortex air cleaner array in a straightthrough course, the acoustic sheets being arranged to deflect such air at least once from the acoustic surface of the sheets in the course of travel through the passages, the total pressure drop across the combination of vortex air cleaner array and array of intercepting spaced acoustic sheets being less than the additive pressure drop across either the vortex air cleaner array or the array of intercepting acoustic sheets, taken separately.

2. A vortex air cleaner-acoustic attenuator in accordance with claim 1, in which the intercepting spaced acoustic sheets in the acoustic array are substantially uniformly spaced apart, and are of substantially the same configuration.

3. A vortex air cleaner-acoustic attenuator in accordance with claim 2, in which the acoustic sheets are straight, and are set at an angle to the axis of the vortex air cleaners, so as to deflect the air stream therefrom from a straightthrough course.

4. A vortex air cleaner-acoustic attenuator in accordance with claim 2, in which the sheets have curved portions that extend over an arc at least long enough so that it is not possible to see from one end to the other end of the passages between the sheets of the array.

5. A vortex air cleaner-acoustic attenuator in accordance with claim 2, in which the sheets are doglegged, and the dogleg sections are at an angle to the axis of the vortex air cleaner array, and the angle of the dogleg is sufficient to cause at least one deflection.

6. A vortex air cleaner-acoustic attenuator in accordance with claim 1, in which the acoustic sheets comprise an acoustic or sound-absorbing material.

7. A vortex air cleaner-acoustic attenuator in accordance with claim 1, in which the acoustic sheets have a spacing to provide from 25% to 75% open area as inlet end openings of the passages therebetween.

8. A vortex air cleaner-acoustic attenuator in accordance with claim 1, in which the acoustic sheets have a thickness from 0.5 inch up to 5 inches.

9. A vortex air cleaner-acoustic attenuator in accordance with claim 1, in which the rows of air cleaners are placed diametrally.

10. A vortex air cleaner-acoustic attenuator in accordance with claim 1, in which the rows of air cleaners are offset and nested in the spaces between adjacent air cleaners of the next row.

11. A vortex air cleaner-acoustic attenuator in accordance with claim 1, in which the acoustic sheets comprise two spaced sheets, with sound-absorbent material sandwiched therebetween.

12. A vortex air cleaner-acoustic attenuator in accordance with claim 11, in which the acoustic sheets comprise two spaced sheets with sound-absorbent material sandwiched therebetween, the sheets and sandwiched material being enclosed in plastic sheet to prevent entry of moisture into the interior.

13. A vortex air cleaner-acoustic attenuator in accordance with claim 1, in which the acoustic sheet passages are from about 6 inches to about 12 inches long.

14. A vortex air cleaner-acoustic attenuator in accordance with claim 1, in which the acoustic sheet passages are arranged to accept effluent air from single rows of vortex air cleaners in the first array.

15. A vortex air cleaner-acoustic attenuator in accordance with claim 1, in which the acoustic sheets are parallel.

16. A vortex air cleaner-acoustic attenuator in accordance with claim 1, in which the vortex air cleaner array comprises a plurality of air cleaners arranged in parallel rows, with the individual cleaners of each row being slightly and uniformly offset from the cleaners of the next row, with the rows placed closer together than the diameter of the individual vortex air cleaners of the rows, and the acoustic attenuator array comprises acoustic sheets which are in parallel, and which define passages in alignment with single parallel rows of vortex air cleaners of the vortex air cleaner array, and having substantially the same diameter as the inside diameter at the narrowest point of the clean air passages of the outlet members of said air cleaners.

17. A vortex air cleaner-acoustic attenuator in accordance with claim 1, in which the vortex air cleaner array comprises a plurality of vortex air cleaners mounted together as a unit with their axes aligned in parallel.

18. A vortex air cleaner-acoustic attenuator in accordance with claim 17, in which the vortex air cleaners are held between support plates at the inlet end of the tubular air cleaner body and at the outlet end of the outlet member so that their scavenge passages empty into a common scavenge chamber between the support plates and the outlet members open into the space beyond the support plates; and a scavenge port in a wall of the scavenge chamber, for the removal of contaminant particles therefrom.

* * * * *